(12) United States Patent
Chang et al.

(10) Patent No.: US 6,314,382 B1
(45) Date of Patent: Nov. 6, 2001

(54) METHODOLOGY FOR TESTING A HIGH CAPACITY FLOPPY DISK UNIT INSTALLED IN A NOTEBOOK COMPUTER

(75) Inventors: Vam Chang, Taipei (TW); Xian-Hong Shen, Shang Hai (CN)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/236,362

(22) Filed: Jan. 25, 1999

(30) Foreign Application Priority Data

Oct. 27, 1998 (TW) ................................................. 87117739

(51) Int. Cl.[7] .................................................. G01L 17/00
(52) U.S. Cl. .............................. 702/115; 702/38; 702/40
(58) Field of Search ..................... 702/115, 38; 324/200; 369/53; 360/31, 67, 71

(56) References Cited

U.S. PATENT DOCUMENTS

| | | | |
|---|---|---|---|
| 4,725,968 | * 2/1988 | Baldwin et al. | 364/550 |
| 5,333,140 | * 7/1994 | Moraru et al. | 371/21.2 |
| 5,383,070 | * 1/1995 | Bond | 360/77.04 |
| 5,412,809 | * 5/1995 | Tam et al. | 395/750 |
| 5,893,048 | * 4/1999 | Pate et al. | 702/56 |
| 5,978,751 | * 11/1999 | Pence et al. | 702/179 |
| 5,983,318 | * 11/1999 | Willson et al. | 711/113 |
| 6,088,182 | * 7/2000 | Taki et al. | 360/71 |
| 6,089,459 | * 7/2000 | Eisele et al. | 235/492 |
| 6,118,632 | * 9/2000 | Albrecht et al. | 360/135 |
| 6,134,378 | * 10/2000 | Abe et al. | 386/52 |
| 6,144,526 | * 11/2000 | Ginosar et al. | 360/133 |
| 6,157,189 | * 12/2000 | Stark et al. | 324/212 |

* cited by examiner

*Primary Examiner*—Patrick Assouad
*Assistant Examiner*—Carol S Tsai
(74) *Attorney, Agent, or Firm*—Bacon & Thomas (57) ABSTRACT

A methodology for testing a floppy disk unit having a large storage capacity, the floppy disk unit being connected to a notebook computer, involves giving corresponding commands to a multi-purpose connector for the disk unit in order to confirm that the disk unit has been properly connected, testing the operation capabilities of the disk unit for various types of diskettes while having the disk head proceed to read-out, write-in, and seek on each track of the diskettes in various movement modes, and having the disk unit perform eject and format functions to ensure normal operation of each function by the disk unit.

7 Claims, 6 Drawing Sheets

METHODOLOGY FOR TESTING A HIGH CAPACITY FLOPPY DISK UNIT INSTALLED IN A NOTEBOOK COMPUTER

FIELD OF INVENTION

The present invention relates to a methodology for testing a floppy disk unit in a notebook PC, and more particularly, to a set of test procedures to run on a new type of high capacity floppy disk unit installed in a notebook PC.

BACKGROUND OF THE INVENTION

Figure 1:
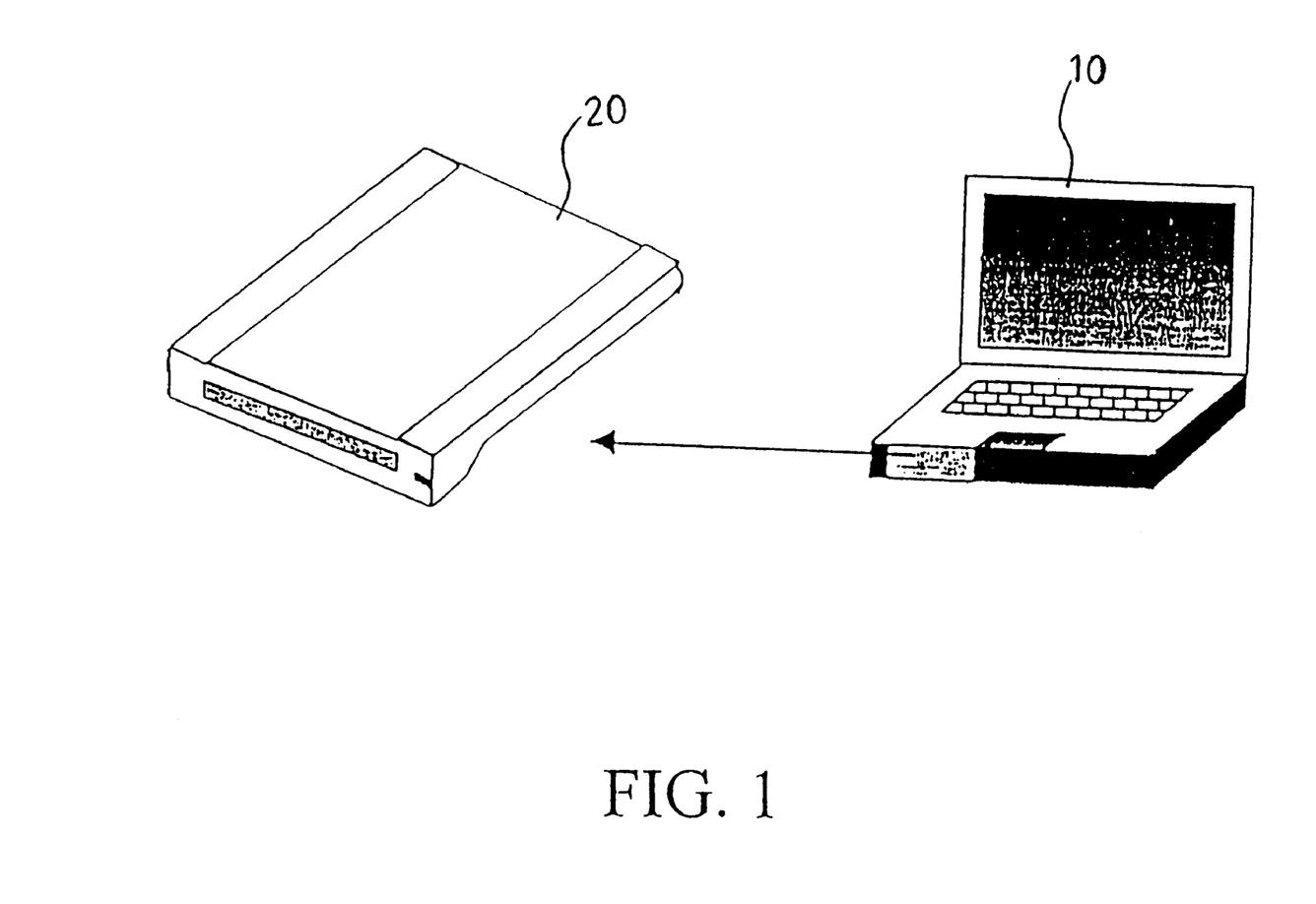
FIG. 1 is a view of the physical relation between a new type of a floppy disk unit and a notebook PC.

Recently, due to the ever advancing electronic technology, and the need for faster processing of information, and the significant growth in the amount of information, computers have become a necessity in the lives or work of contemporary people, relied upon by ever increasing numbers of users to process and exchange mass information of various types. The portable notebook personal computer allowing easy operation is one type of computer that is favored by those who need to process mass information. However, the traditional disk unit with small storage capacity (720K, 1.44M) has not kept up with the latest developments, which has caused the introduction into the market of a new type of floppy disk unit 20, as illustrated in FIG. 1, using 120M diskette. When assembled with a notebook PC 10, the disk unit 20 with its high-speed and larger storage provides much more convenient access to computer operation and information processing by a user and will become a valuable tool for information processors.

In the past, the disk unit used by the notebook PC manufacturer generally was of small storage capacity (720K, 1.44M) capable of reading a diskette with smaller storage. Very few test methods, if any, were provided to run on such type of disk unit. While the density of the magnetic medium of the latest diskette and the operation speed of the latest disk unit both increase, the failure rate of the disk unit is relatively higher since it is far more precise and complicated than the traditional disk unit. However, such failure has not deterred the user's demands on the operation accuracy by the latest disk unit. Such demands are justified since any slight error might well cause a major loss to the user, particularly in a contemporary society thirsty for full utilization of information edges where the reliability of information storage facilities becomes ever more important. Therefore, to ensure user satisfaction with the reliability of the latest disk units and notebook PCs, a set of integral and dependable testing procedures with strong relevance is required to provide functional tests that identify possible defects due to poor contact or impacts by and among all relevant parts in the process of assembly.

SUMMARY OF THE INVENTION

The primary objective of the present invention is to provide an additional test item for each of the pins provided on a notebook PC used to mate with the multi-purpose connector of a new type of floppy disk unit with large storage capacity, so as to preclude possible errors caused by the disk unit and to avoid massive waste of time spent on subsequent tests in the presence of defective pins.

Another objective of the present invention is to provide an assurance that the disk unit provided in a notebook PC is capable of reliable operation with a floppy diskette having a different surface medium density, with additional test items for format and fast operation (including but not limited to read-out, write-in and seek) by said diskettes, in floppy disk units such as Model LS-120 floppy disk units produced by Japan-based Mitsubishi, which can be operated with floppy diskettes of 120M, and also with the smaller storage capacity disk drives such as 720K and 1.44M drives.

Another objective of the present invention is to provide a test method involving the use of a disk unit head to respectively test each track of a floppy diskette in the form of sequential movement, movement by size of range, and at random. Test items include data read-out, write-in and seek capabilities of the track, as well as capabilities to execute formatted commands and automatically eject the floppy disk unit.

DETAILED DESCRIPTION OF THE INVENTION

The present invention involves conducting the following tests on a floppy disk unit with large storage capacity installed into a notebook PC (in one of the embodiments of the present invention, said floppy disk unit may be a Model LS-120 disk unit produced by Mitsubishi, Japan):

(1) Before running tests on the floppy disk unit by the present invention, each and all pins on the floppy disk unit and those on the notebook PC are tested to preclude possible errors from the floppy disk unit and avoid the massive waste of time spent on subsequent test items due to the presence of a defective pin, thus effectively improving the accuracy and efficiency of testing on the floppy disk unit.

Figure 2:
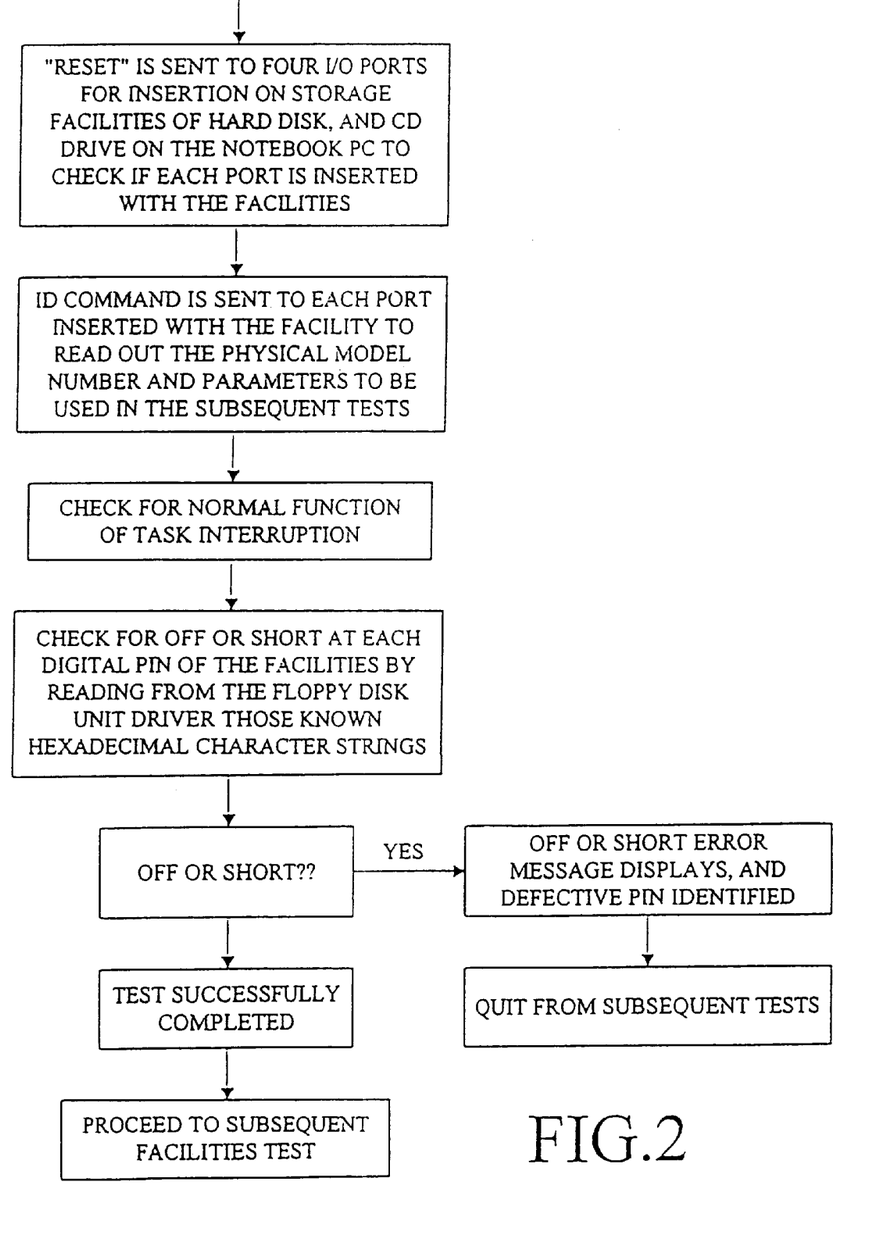
FIG. 2 is a flow chart showing the test method embodied in the present invention that is conducted, before running tests on the floppy disk unit, on each and all pins on the floppy disk unit and those on the notebook PC which plug in the multi-purpose connector of the disk unit.

Referring to FIG. 2, upon running tests by the present invention on each and all pins from the notebook PC used to plug in more than one multi-purpose sinks of the floppy disk unit, the notebook PC sends a command of "Reset" to said multiple sinks to judge if said multi-purpose sinks have been connected to the floppy disk unit. Then a command for facilities identification is sent to the multipurpose connectors connected to the floppy disk unit while reading type, serial number, and relevant parameters of the floppy disk unit for reference by the subsequent tests. Meanwhile, the notebook PC sends signals of interruption to test if the floppy disk unit executes the interruption normally. Then, the hexadecimal character strings comprised of 0×01, 0×02, 0×04, 0×08, 0×10, 0×20, 0×40, 0×80 and O×55AA are read to detect whether each pin on the floppy disk unit or on the notebook PC used to plug in the multi-purpose sink of the floppy disk unit is off or shorted. If yes, an error message of Off or Short is displayed, as is the location of the pin found with such error, and the test procedure is interrupted for the service engineer to correct. If not, a normal condition for each pin is displayed and the method proceeds to the next step of the test procedure.

(2) The notebook PC then sends commands to the floppy disk unit to perform Reset, Inquiry and Mode Sense to check for any defects in the hardware circuit of the floppy disk unit depending on whether the results of those commands executed are successful or not.

Figure 3:
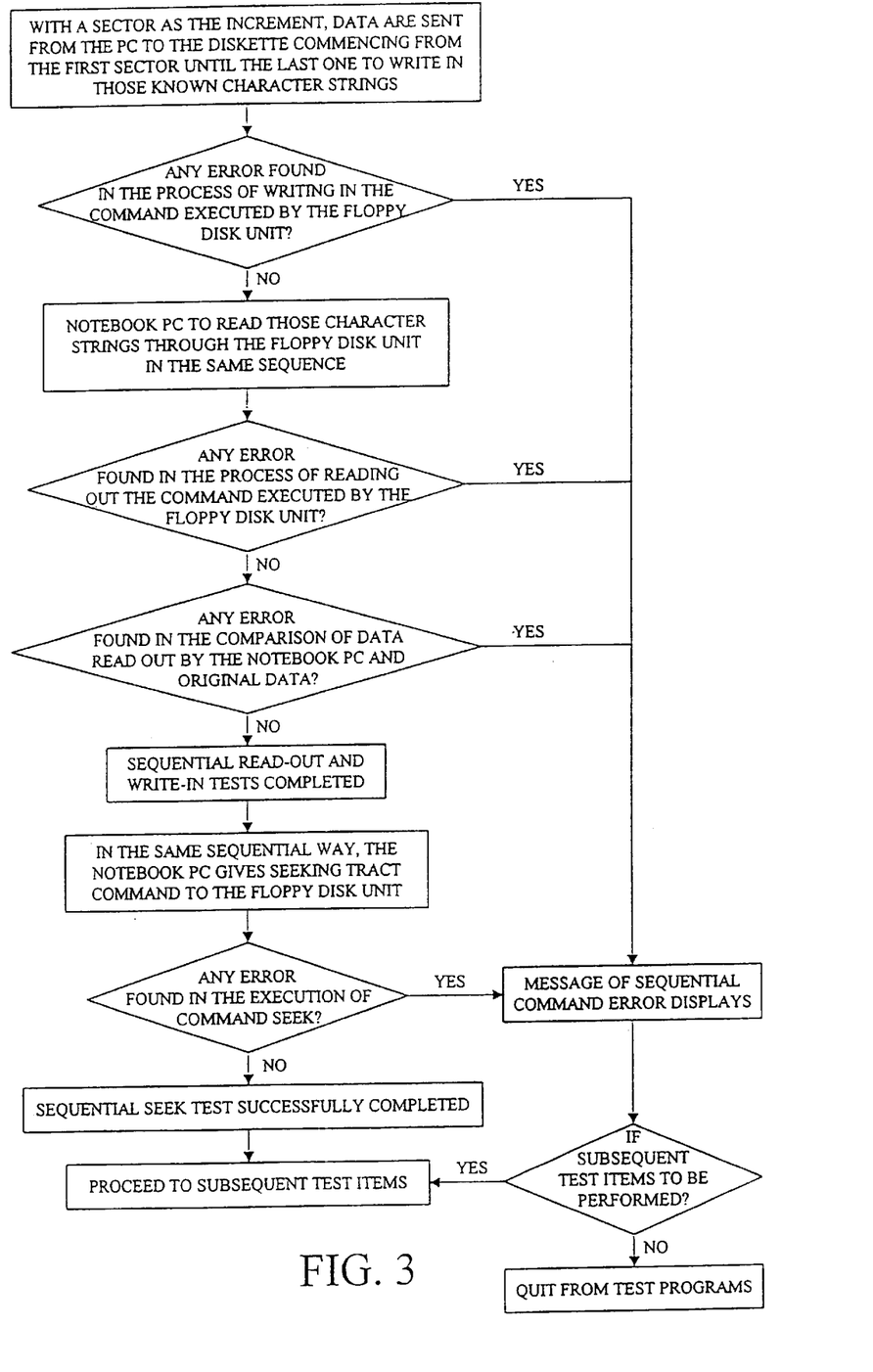
FIG. 3 is a flow chart showing the test method embodied in the present invention that is conducted in sequence on the procedures to execute write-in, read-out and seek by the floppy disk unit starting with track zero on the notebook PC.

(3) By referring to FIG. 3, starting with track 0 on the notebook PC using sectors as the unit of increment, digits are transmitted to a diskette inserted into the floppy disk unit, and preset serial character strings are written in one by one in sequence commencing from the first sector until the last one to check for any error to the floppy disk unit in executing the write-in procedure. If yes, an error message is displayed and whether a selection to be made to interrupt the subsequent test procedures by the service engineer is determined.

If no error is identified, those same serial character strings are read out from the diskette by the notebook PC in the same sequence through the floppy disk unit to determine if there is any error taking place in the write-in procedure executed by the floppy disk unit. If yes, an error message is displayed and whether a selection to be made to interrupt the subsequent test procedures by the service engineer is determined.

In the absence of such error message, the notebook PC makes a comparison between digits read out and preset ones that have been written in earlier to determine if there is any error. If yes, an error message is displayed and whether a selection to interrupt the subsequent test procedures by the service engineer is determined.

The absence of such error message indicates normal read-out and write-in test procedures in sequence. Then, in the same sequence, the notebook PC gives to the floppy disk unit a command to seek a track while determining if there is any error found in the seeking procedure executed by the floppy disk unit. If yes, an error message is displayed and whether a selection to interrupt the subsequent test procedures by the service engineer is determined. If not, a normal sequential seek test procedure is indicated and the method proceeds to the subsequent test procedures.

Figure 4:
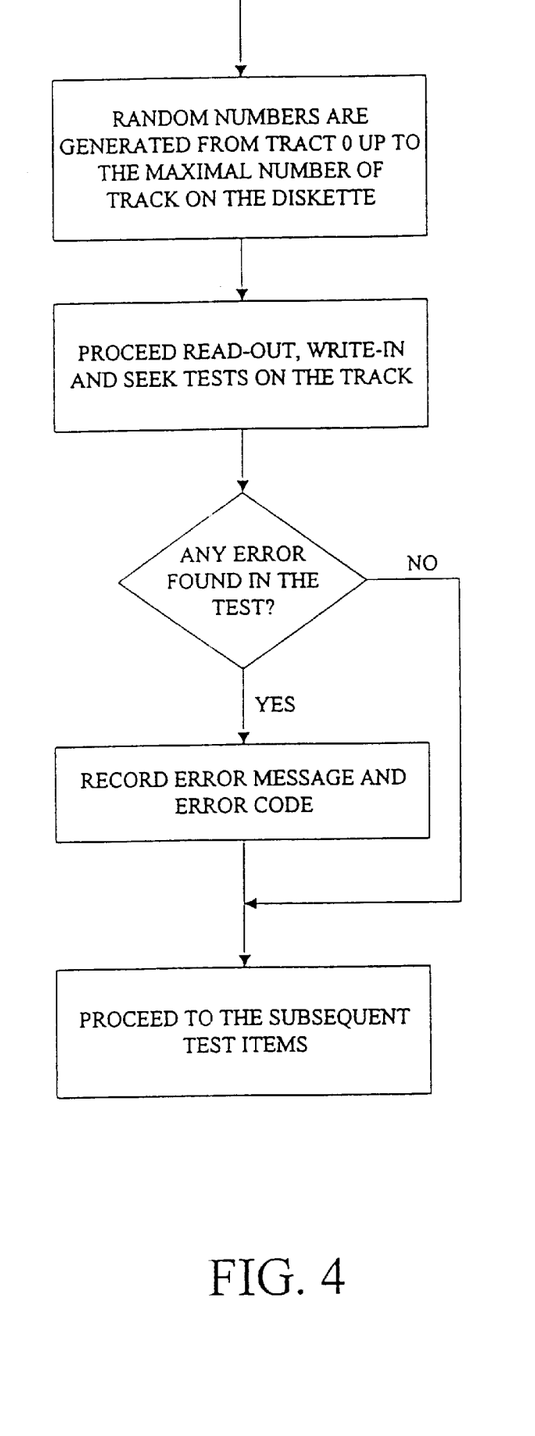
FIG. 4 is a flow chart showing the test method embodied in the present invention that is conducted on the procedures to execute write-in, read-out and seek by the track with a set of random numbers generated by the notebook PC from zero to that of the maximum track of a floppy diskette.

(4) As illustrated in FIG. 4, a set of random numbers commencing from track 0 up to the maximal track number generated by the notebook PC are used to run tests of read-out, write-in and seek on each track while determining if there is any error in the floppy disk unit during the test procedure. If yes, an error message is displayed; if not, the sequence goes to the subsequent test procedures.

Figure 5:
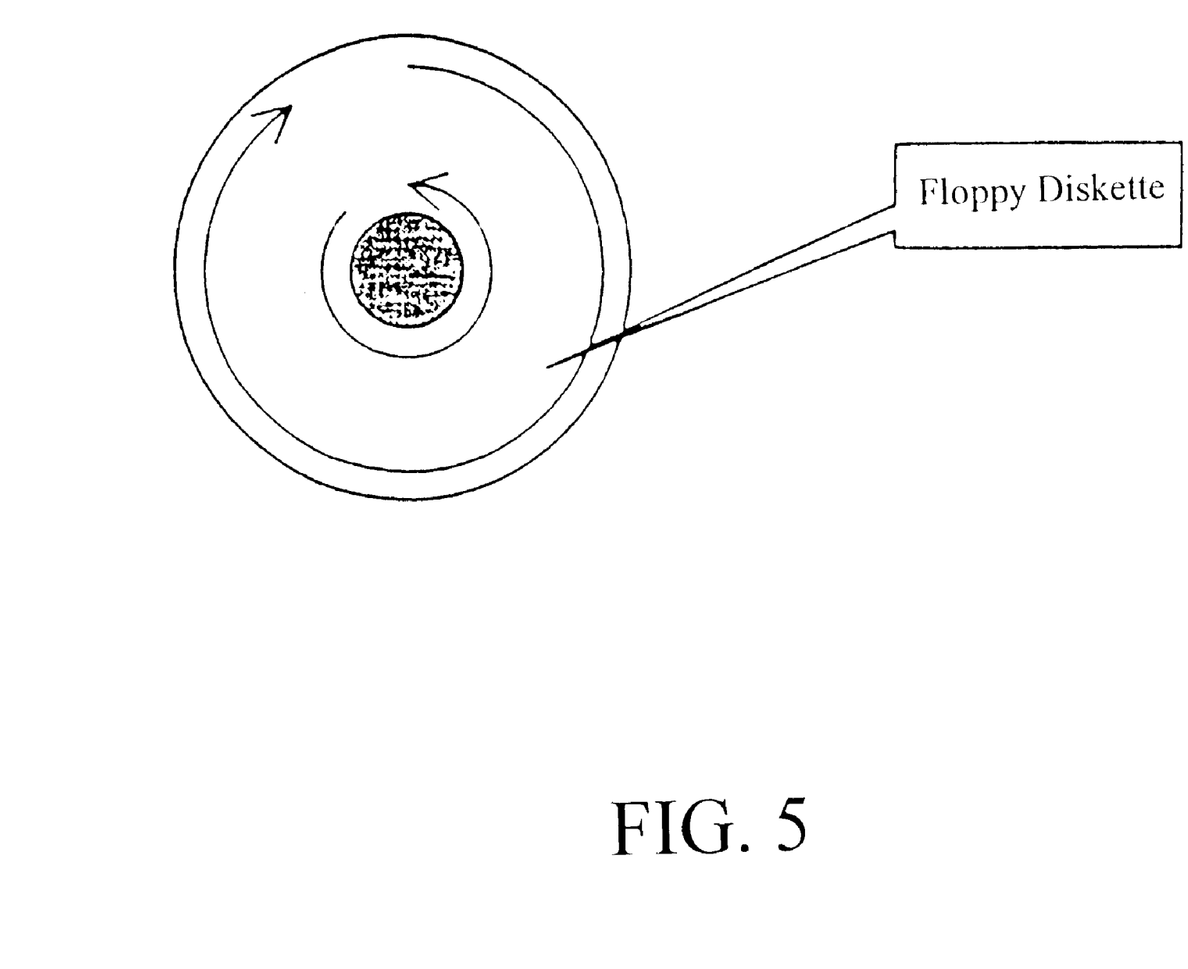
FIG. 5 is a flow chart showing the test method embodied in the present invention that is conducted on the procedures to execute read-out, write-in and seek in sequence of the track zero, track n, track 1, track n-1, and so on, of the diskette by the notebook PC.

(5) The notebook PC then carries on read-out, write-in and seek in sequence on track 0, track n, track 1, track n-1, and so on (for example, in a test given to tracks 0–80, the sequence is 0→80→1→79→2→78 . . . 40→41) of the diskette as illustrated in FIG. 5. In such a sequence, the head of the disk unit moves the maximal distance which is then reduced until the head moves to the track of middle numbers so to complete the test on the functions of the read-out, write-in and seek by the head of the floppy disk unit at each different range.

During the tests on read-out, write-in and seek by the head of the floppy disk unit respectively described in the preceding paragraphs (3), (4) and (5), the present invention automatically identifies the type of the diskette inserted, then proceeds to the subsequent tests by type of diskette.

(6) The notebook PC, depending on the specification of the diskette inserted, carries on read-out, write-in and seek tests. The substitution of the traditional disk unit with a floppy disk unit having large storage capacity is essentially to significantly promote its storage capacity, but the high capacity type of floppy disk unit is also compatible which those diskettes with smaller storage capacities, such as 720K and 1.44M. As the density of the surface magnetic media varies depending on the storage capacity of the diskette, tests conducted just on a particular type of diskette are not sufficient to cover all the features of the floppy disk unit. Therefore, the present invention provides additional tests to be conducted on fast read-out, write-in and seek capabilities of different types of diskette to ensure the adaptability of the floppy disk unit having large storage capacity to various types of diskette.

(7) The notebook PC therefore runs a test on the command of Format for various types of diskette. Since executing Format on a diskette is one of the major functions of a floppy disk unit and various types of diskettes may be used by the floppy disk unit with large storage capacity, the test must be carried out to ensure its capability to execute the command of formatting the various types of diskette.

(8) Finally, the notebook PC is used to test the automatic eject of the diskette inserted to the floppy disk unit. The set of commands for the floppy disk unit contains a command to require automatic eject of a diskette inserted into the floppy disk unit. The present invention provides this additional test on the ability to execute the command of automatic eject to conclude tests on all the functions available by the floppy disk unit.

Figure 6:
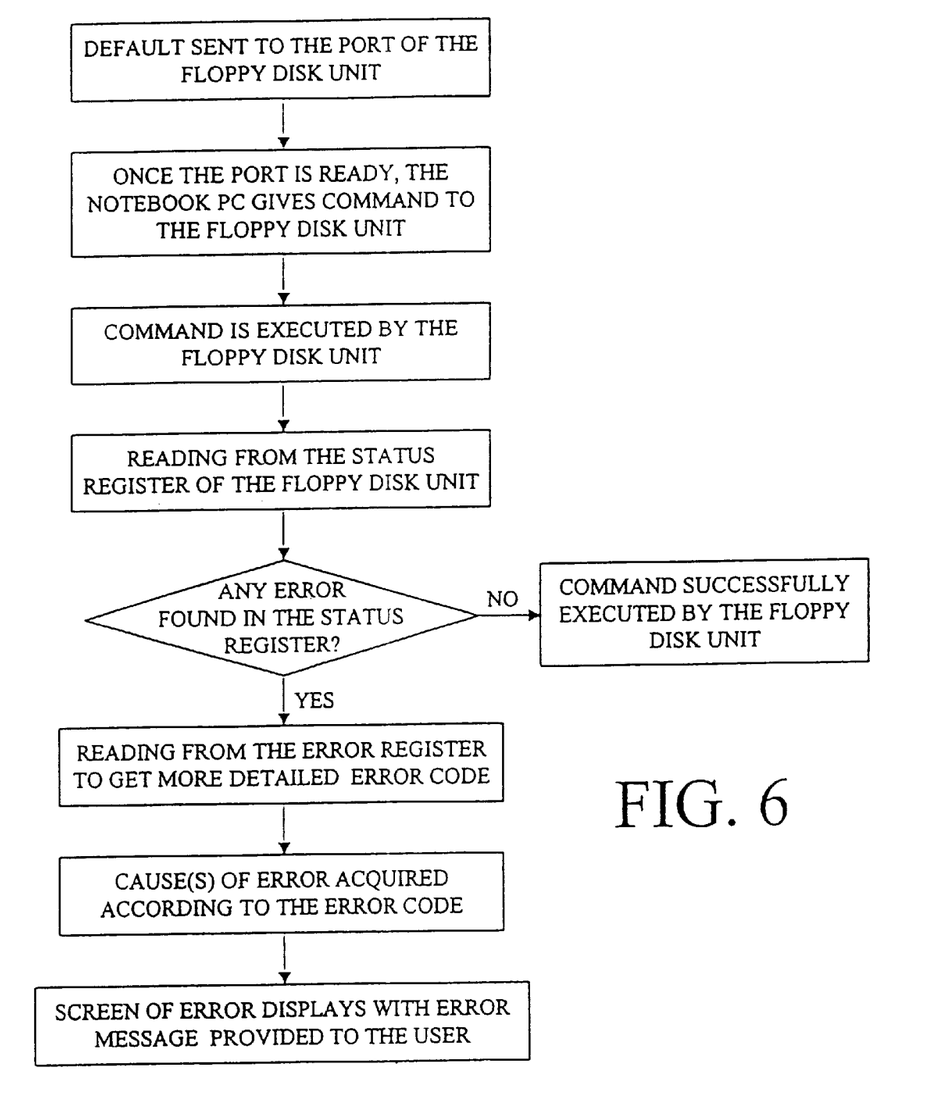
FIG. 6 is a flow chart showing the test method embodied in the present invention that is conducted by the notebook PC on the capabilities of the floppy diskette to execute each relevant command.

Now referring to FIG. 6, those tests on the capabilities of the floppy disk unit described in the preceding paragraphs (7) and (8) are essentially carried out by the following procedures:

First, the notebook PC sends a default to the port of the floppy disk unit, followed with a command to be executed by the floppy disk unit once the port is ready. Then numeric values stored in a status register of the floppy disk unit are read out to determine the presence of any error. If yes, numeric values stored in an error register are read out for a more detailed error code indicating the cause(s) of such an error while an error message is displayed for the service engineer to refer to. The absence of any error indicates that the command has been successfully executed.

As described above, a number of commands of write-in and formatting a diskette must be executed in the process of the present invention, and that might damage existing data on the diskette. Therefore, those data justify protection. Before proceeding with a test by the present invention, a backup of the existing data on the diskette must be made for later restoration upon the completion of the test. To a diskette with small storage capacity, the present invention duplicates through the notebook PC the existing data into a document on a hard disk unit, and rewrites such data back to the diskette upon the completion or the interruption of the test procedures of the present invention. However, in case of a diskette with large storage capacity (e.g. 120M), it is difficult to preserve such massive data. Therefore, the present invention, by restoring the boot record, FAT and Directory on the diskette, makes the diskette become a blank one upon the completion of the test for normal usage.

Furthermore, precision of the operation including read-out, write-in and seek executed by the floppy diskette with large storage capacity is vulnerable to its surroundings, such as vibration caused by patting, or shaking, and error can easily take place. Therefore, the present invention allows setup of the times of re-test upon the failure to read-out, write-in or seek, to exclude errors resulting from environmental impacts and achieve even more accurate test results.

The tests disclosed herein sufficiently reflect all possible operation procedures and use requirements on a floppy disk unit by a general user, and it is generally appropriate to run the full range of tests to be run on the floppy disk unit.

The scope of patent rights claimed by the present invention however is not limited by those preferred embodiments described above and any equivalent variation that can easily become available based on the technical contents disclosed by anyone who is familiar with the field of this art shall be included in the scope of protection of the present invention.

What is claimed is:

1. A method of testing a floppy disk unit having a large storage capacity, said floppy disk unit being connected to a notebook computer, comprising the steps of:
   (1) sending Reset, Inquiry and Mode Sense commands to the floppy disk unit to check for any defects in a hardware circuit in the floppy disk unit based on whether said Reset, Inquiry and Mode Sense commands have been successfully executed;
   (2) testing a diskette inserted into the floppy disk unit for any error in read-out, write-in, and seek-by-track procedures and, if an error is found, displaying an error message and determining whether a service engineer should interrupt subsequent test procedures;
   (3) testing the floppy disk unit for any error in fast read-out, write-in and seek procedures for each of a plurality of different types of diskettes compatible with said floppy disk unit;
   (4) testing an ability of the floppy disk unit to execute a Format command on each type of diskette;
   (5) testing the notebook computer for any error in an automatic eject function for any diskette inserted into the floppy disk unit, wherein for a floppy diskette having tracks numbered sequentially from 0 to n, the step of testing the floppy disk unit for any error in read-out, write-in, and seek-by-track procedures, a head of the floppy disk unit is moved a maximal distance, and then is moved a progressively reduced distance until the head moves to a middle track of the diskette in a sequence commencing at Track 0, and then proceeding to Track n, Track 1, Track n-1, and so forth.

2. A method of testing a floppy disk unit having a large storage capacity as claimed in claim 1, wherein, before conducting tests on the floppy disk unit, all pins on the floppy disk unit and all pins in multiple purpose connectors on the notebook computer that may be used to plug the floppy disk unit into the notebook computer using the following steps:
   (1) sending a Reset command from the notebook computer to the connectors to determine if the floppy disk unit has been connected to connectors;
   (2) giving a Facilities Identification command any of the connectors already connected to the floppy disk unit while reading out a type, model number, and relevant parameters from the floppy disk unit for subsequent tests to refer to;
   (3) sending an interrupt signal from the notebook computer to test if the floppy disk unit connected to the notebook computer is capable of interrupting a task normally; and
   (4) by reading out character strings having a known status in the floppy disk unit to check for any of said pins that are off or shorted and, if an error is found, displaying an Off or Short error message, indicating a location of a pin causing such error, and interrupting subsequent test procedures.

3. A method of testing a floppy disk unit having a large storage capacity as claimed in claim 2, wherein said character strings are hexadecimal strings.

4. A method of testing a floppy disk unit having a large storage capacity as claimed in claim 1, wherein, during said step of read-out, write-in and seek by the notebook computer on each track of the diskette inserted in the floppy disk unit, tests are carried out incrementally by sectors according to the following steps commencing from track 0,:
   (1) transmitting data to the diskette inserted into the floppy disk unit, by writing preset serial character strings into the diskette in sequence starting from a first sector until a last sector, to test the floppy disk unit for any error in the write-in procedure and, if an error in the write-in procedure is found, displaying an error message and determining whether the service engineer should interrupt subsequent test procedures;
   (2) in the absence of said error in the write-in procedure, reading out said serial character strings through the floppy disk unit in sequence from the diskette in the same order as in the writing procedure of paragraph (1) to check for any further error in the read-out procedure executed by the floppy disk unit and, if an error in the read-out procedure is found, displaying an error message and determining whether the service engineer should interrupt subsequent test procedures;
   (3) in the absence of said read-out error, comparing the date read-out with preset data previously written into the diskette to check for any error and, if any difference is found, displaying an error message and determining whether the service engineer should interrupt subsequent test procedures; and
   (4) in the absence of said difference, indicating that the sequential read-out and write-in procedures are normal, in which case the notebook computer gives a Seeking Track command to the floppy disk unit in the same as used in the write-in procedure to check for any error made by the floppy disk unit in executing the seek procedure and, if any seek error is found, displaying an error message and determining whether the service engineer should interrupt subsequent test procedures.

5. A method of testing a floppy disk unit having a large storage capacity as claimed in claim 1, wherein random numbers starting from Track 0 up to a maximal track number on the diskette are generated by the notebook computer in performing read-out, write-in and seek tests on each track of the diskette in the floppy disk unit to check for any error taking place in the floppy disk unit during the test procedures and, if any error is found, displaying an error message and determining whether the service engineer should interrupt subsequent test procedures.

6. A method of testing a floppy disk unit having a large storage capacity, said floppy disk unit being connected to a notebook computer, comprising the steps of:
   (1) sending Reset, Inquiry and Mode Sense commands to the floppy disk unit to check for any defects in a hardware circuit in the floppy disk unit based on whether said Reset, Inquiry and Mode Sense commands have been successfully executed;

(2) testing a diskette inserted into the floppy disk unit for any error in read-out, write-in, and seek-by-track procedures and, if an error is found, displaying an error message and determining whether a service engineer should interrupt subsequent test procedures;

(3) testing the floppy disk unit for any error in fast read-out, write-in and seek procedures for each of a plurality of different types of diskettes compatible with said floppy disk unit;

(4) testing an ability of the floppy disk unit to execute a Format command on each type of diskette;

(5) testing the notebook computer for any error in an automatic eject function for any diskette inserted into the floppy disk unit, wherein, if any message is displayed in the course of said read-out, write-in and seek tests, times for a re-test are arranged to exclude errors caused by environmental impacts so as to achieve even more accurate test results.

7. A method of testing a floppy disk unit having a large storage capacity as claimed in claim 1, wherein each of said steps is carried out by performing the following steps:

(1) sending a default to a port of the floppy disk unit until the port is ready for the tests;

(2) sending a relevant command desired to be executed to the floppy disk unit and ordering the floppy disk unit to execute the command;

(3) reading numeric values stored in status register of the floppy disk unit and determining whether an error has occurred, and if an error has occurred, reading out numeric values stored in an error register to get a more detailed error code, which then is used acquire and display a cause for the error to assist the service engineer in finding a remedy, wherein an absence of an error message indicates a relevant command has been successfully executed.

* * * * *